United States Patent [19]

Crnojevich et al.

[11] Patent Number: 4,954,168
[45] Date of Patent: Sep. 4, 1990

[54] RECLAIMING OF ALUMINUM-CHROMIUM WASTE MATERIALS FROM ETCHING OPERATIONS

[75] Inventors: Ranko Crnojevich; Edward I. Wiewiorowski, both of New Orleans; Andrew B. Case, Harvey, all of La.

[73] Assignee: AMAX Inc., New York, N.Y.

[21] Appl. No.: 352,301

[22] Filed: May 15, 1989

[51] Int. Cl.$^5$ .............. C22B 3/00; C01G 37/00; C01F 7/00
[52] U.S. Cl. ........................ 423/55; 423/53; 423/122; 423/127; 423/132; 423/140
[58] Field of Search .............. 423/53, 55, 122, 127, 423/132, DIG. 1, DIG. 2, 140; 75/101 R, 121, 108

[56] References Cited

U.S. PATENT DOCUMENTS

| | | | |
|---|---|---|---|
| 1,421,804 | 7/1922 | Mejdell | 423/122 |
| 2,435,304 | 2/1948 | Foerster et al. | 75/121 |
| 2,842,436 | 7/1958 | Dasher et al. | 75/101 R |
| 3,539,468 | 11/1970 | Wright | 423/127 |
| 3,899,568 | 8/1975 | Frick | 423/122 |
| 4,162,294 | 7/1979 | Witzke | 423/55 |
| 4,242,127 | 12/1980 | Muller et al. | 75/121 |
| 4,332,584 | 6/1982 | Maralidhara | 423/53 |
| 4,337,227 | 6/1982 | McDonald | 423/53 |
| 4,567,026 | 1/1986 | Lisowyj | 423/140 |
| 4,798,708 | 1/1989 | Ladd | 423/55 |

FOREIGN PATENT DOCUMENTS 484637  7/1952  Canada .................. 423/122

Primary Examiner—Robert L. Stoll
Assistant Examiner—Steven J. Bos
Attorney, Agent, or Firm—Michael A. Ciomek; Eugene J. Kalil

[57] ABSTRACT

A method is provided for treating sludge containing substantial amounts of chromium, aluminum and iron and residuals of other elements. The method comprises forming a slurry of the sludge in water at a temperature ranging from ambient to 150° F. with the specific gravity of the slurry ranging from about 1.05 to 1.25, and adding a mineral acid to the slurry to provide a pH ranging from about 0.1–3 to dissolve selectively the aluminum and the chromium and leave a solids residue containing gangue material comprising an oxidized iron compound, calcium sulfate, calcium fluoride, calcium silicate among other solids. The pH of the solution is controlled at range of about 2 to 3.5 to precipitate undesirable elements, including iron, without substantially adversely affecting the dissolved chromium and aluminum. The chromium/aluminum-containing solution is separated from the solids therein to provide a substantially purified solution of chromium/-aluminum, and the pH of the solution raised to a range of about 12 to 13.8 to precipitate chromium as chromium hydroxide and provide a pregnant aluminate solution. The chromium hydroxide-containing solution is then subjected to solid/liquid separation to extract chromium hydroxide therefrom and providea pregnant aluminate solution which is thereafter treated to recover alumina therefrom.

10 Claims, 1 Drawing Sheet

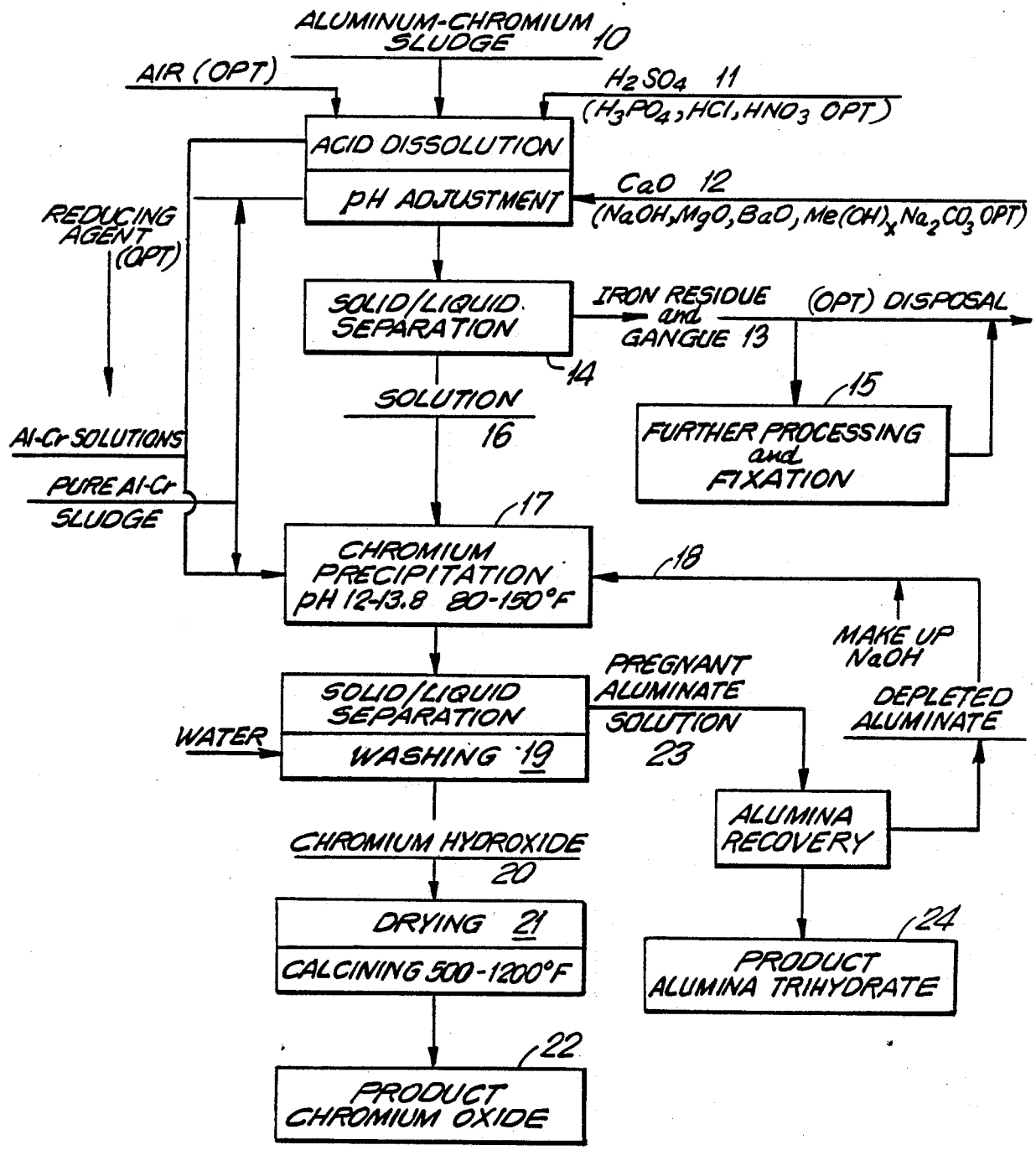

RECLAIMING OF ALUMINUM-CHROMIUM WASTE MATERIALS FROM ETCHING OPERATIONS

This invention relates to the recovery of chromium and aluminum from waste material, such as sludge.

Background of the Invention

Chromic acid is used as an etchant in the preparation of surfaces of finished aluminum products, such as sheets, rods, windows, doors, and the like, to receive a coating of paint or other coating material. Chromic acid is either used alone or with phosphoric acid or other additives.

Because of the use of the chromic acid treatment, hazardous wastes are produced in the form of solutions, sludges, slurries, dried solids, and the like, which contain predominantly aluminum and chromium. Optionally the waste material may also contain phosphates, iron and usually calcium. Calcium may be present due to the use of CaO as a neutralizing agent or for precipitating chromium in the waste treatment facilities of the etching operation.

Because the waste materials produced as described above are hazardous to the immediate environment, EPA laws of the various states and the Federal Government mandate that such materials be safely disposed of without toxically affecting the environment, such as surface waters, ground waters, soil, etc.

The purpose of this invention is to provide a method for recovering chromium and aluminum as a marketable or reusable commodity and/or products in order to minimize the amount of waste that has to be processed or safely disposed.

Object of The Invention

It is thus an object of the invention to provide a method for treating waste materials containing substantial amounts of chromium and aluminum, whereby the chromium and aluminum can be recovered and provide a solids residue that can be easily disposed of without adversely affecting the environment.

This and other objects will more clearly appear when taken in conjunction with the following disclosure and the claims.

Brief Description of the Drawings

The appended drawing is a flow sheet of one embodiment for carrying out the aims and objects of the invention in which aluminum/chromium sludge is treated to produce a product comprising chromium oxide and a product comprising alumina.

Summary of The Invention

One aspect of the invention is directed to a method for treating sludge containing substantial amounts of chromium, aluminum and iron and residuals of other elements. The method comprises, forming a slurry of the sludge in water at a temperature ranging from ambient to about 150.F with the specific gravity of the slurry ranging from about 1.02 to 1.25, adding a mineral acid to the slurry to provide a pH ranging from about 0.1-3 to dissolve selectively aluminum and chromium and provide a solids residue containing gangue material comprising an oxidized iron compound, calcium sulfate, calcium fluoride, calcium silicate among other solids, and then controlling the pH at a range of about 2 to 3.5 to precipitate undesirable elements, including iron, without substantially adversely affecting the dissolved chromium and aluminum in the solution.

The method also includes separating the chromium-/aluminum-containing solution from the solids therein to provide a substantially purified solution of chromium/aluminum, raising the pH of the solution to a range of about 12 to 13.8 to precipitate chromium as chromium hydroxide and provide a pregnant aluminate solution, and then subjecting the chromium hydroxide-containing solution to solid/liquid separation and thereby extract chromium hydroxide therefrom and provide a pregnant aluminate solution which is thereafter treated to recover alumina therefrom. The chromium hydroxide precipitate is then washed and dried.

A typical sludge composition prior to treatment may comprise by weight about 2.5% to 20% chromium, about 2% to 15% aluminum, 0 to 15% iron, 0 to about 12.0% phosphorus, 0 to about 10% calcium, and residuals.

Details of The Invention

The invention will be described in accordance with the accompanying flow sheet in which sludges containing various proportions of major elements, such as chromium, aluminum, iron, calcium, magnesium, phosphorus, and other elements in minor quantities, are treated with acids to substantially dissolve valuable metals of aluminum and chromium and preferably leave gangue material $CaSO_4$, $CaF$, $CaSiO_4$ and iron in the undissolved residue. Dissolution is carried out under a relatively low to moderate pH, for example, about 0.1–3.0, generally in the pH range of about 1.0–2.5 at an ambient or moderately elevated temperature, such as about 70–150° F.

Acids which will cause aluminum and chromium to dissolve in the solution can be used, including $H_2SO_4$, HCl, $HNO_3$, $H_3PO_4$; sulfuric acid being the most commonly used reagent because of economical reasons. These acids are hereinafter referred to as mineral acids.

Air (oxygen) or any other available mild oxidant may be used during dissolution to oxidize any ferrous iron present to the ferric state while maintaining chromium in the trivalent state.

Following the dissolution of aluminum and chromium, the pH of the reaction system (in presence of the undissolved solids) is controlled at a medium pH of about 2.0–3.5, preferably about 2.5–3.0, such as by adjustment, to precipitate some undesirable elements, iron for example, while minimizing the precipitation of chromium and aluminum.

The pH can be controlled by adding any of many available alkaline reagents, such as hydroxides or carbonates of sodium or potassium or oxides/carbonates/hydroxides of calcium, magnesium, barium, aluminum and chromium. The product of the pH control or adjustment step undergoes a solid/liquid separation (commonly by filters, or centrifuges or by decantation) to yield a substantially purified chromium and aluminum solution, while leaving an iron residue. Recovery of aluminum and chromium in the purified solution is normally very substantial, being about 70–98%, or about 85–95%, of the total aluminum and chromium content of the waste material.

The amount and composition of the iron residue will depend on the initial composition of material and the reagents used for dissolution and pH adjustment.

For example, phosphoric acid can be used as dissolution agent as well as the agent enhancing selective iron removal at pH 2.0–3.0, thus generating more of the residue. On the otherhand, the use of calcium or barium compounds in a sulfate medium, would be more economical than NaOH or KOH. These compounds tend to enhance filterability of the residue as well as increase the amount of residue.

In general, the initial aluminum-chromium material of sludge will be reduced (on the dry basis) in the iron residue to about 5–45% of the original quantity, generally to about 20% of the original quantity.

This residue can be disposed as such in a conventional manner, or preferably further processed as proposed in this invention by heating the material from about 300° F. to 450° F., preferably 400° F., at superatmospheric pressure ranging from about 70 to 300 psig, dispersed in a water medium, or in water containing alkalies and aluminates. Or the material can be heated in air in excess of 800° F., for example, at about or above 1000+ F. and thereby fix chromium into a non-soluble form through formation of spinels or garnet type minerals and thus render the material a non-hazardous waste as prescribed by the EPA toxicity test.

The substantially purified chromium-aluminum solution is then further treated to recover the chromium and aluminum as concentrates or other products. This can be achieved by selective pH precipitation at moderate to elevated temperatures. It can be conveniently and economically advantageously achieved in this invention by raising the pH of the solution to a relative high level, say pH 11.5–13.8, preferably a pH range of 12.0–13.0, by adding alkaline hydroxides (NaOH, KOH) where aluminum will remain in the solution as an aluminate while chromium is completely precipitated as chromium hydroxide. This reaction is carried out at normal or elevated temperatures, such as about 50–210° F., preferably about 100–150° F.

A higher alkalinity, i.e., pH 13–14, may be employed to minimize the content of phosphorus and zinc in the final chromium product.

The chromium hydroxide precipitate, after washing, is filtered off or centrifuged and marketed as such. Or the precipitate may be dried (temperature about 150–300° F.) or preferably dried and semicalcined at temperatures above about 500° F., preferably about 1000–1300° F., for conversion into chromium oxide comparable to a high grade chromite ore.

In some instances, the chromium-aluminum solids or sludges may be sufficiently pure so that they can be processed directly into the chromium precipitation step. That would generally be the case when these materials contain mainly aluminum and chromium with only minor proportions of iron and are substantially free of calcium, phosphorus, and other deleterious elements, the presence of which would diminish the marketability or usability of the final chromium product.

Also, processing of the chromium-aluminum solution, rather than solids, will nor require the dissolution step. This material can be processed independently or concurrently with the solid or sludge material. If the solution is highly acidic, it can be used as an acid source in the dissolution step, otherwise, if moderately acidic, it can be fed directly to the pH adjustment step. If the solution contains a substantial amount of hexavalent chromium, it will require pretreatment with a reducing agent ($SO_2$, $Na_2SO_3$, electric current, ferrous iron, etc.) to convert Cr(VI) to Cr(III).

The chromium product produced in accordance with the invention will generally contain about 30–60% $Cr_2O_3$, typically about 48–53% $Cr_2O_3$ after a heat treatment at temperatures above 500° F. This chromium product would be comparable to a high content natural chromite ore.

After the chromium is removed from the chromium-aluminum solutions, aluminum can be recovered from alkaline aluminate solutions by several means. Advantageously to achieve maximum utilization of reagents, aluminum is recovered in the present invention by precipitating aluminum trihydrate in an autoseeded crystallization or by sparging gaseous $CO_2$ into and through the strong alkaline aluminate solutions. As a result of precipitating aluminum trihydrate, a free caustic reagent (NaOH or KOH) is regenerated which can be reused in the chromium precipitation step. The solution at pH of 12.0–13.5 will contain 30–200 gpl free alkaline hydroxide. The aluminate solutions can also be conveniently coprocessed with a similar stream in the facilities used for aluminum recovery.

Example 1

Referring to the appended flow sheet, 1,948 lbs. of Al-Cr sludge (10) (on dry basis) analyzing by weight 14.6% Cr, 10.7% Al, 9.4% Fe, 0.2% P, 2.3% Ca were slurried in 3900 gal. of water (60 gpl solids) at an ambient temperature of 88° F. The pH of the slurry was first lowered to 2.0 by the addition of 96.0 gal. of concentrated $H_2SO_4$ (11) or other mineral acid to dissolve substantially all of the chromium and aluminum, following which the pH was readjusted to 2.9 with the addition of 275 lbs. of CaO I2 to precipitate the majority of the iron (13) present.

The solution of aluminum and chromium was filtered off (14) and the iron residue collected for further treatment at (15) (not Example No. 5 hereinafter). The iron residue, 880 lbs., represented 45% of the original weight of the sludge and contained 82.8% of the iron initially present in the Al-Cr sludge.

The resulting solution (16) analyzed about 6 gpl Cr and about 5 gpl Al. Chromium hydroxide was then precipitated at (17) by raising the pH to 12.0 and then charging additional 50 gpl NaOH (18). The chromium hydroxide was washed at (19) with water twice by decantation and the washed chromium hydroxide(20) dried at 250° F. yielding an intermediate product containing 43.8% $Cr^2O_3$.

The dried product (22) was then heated in air at 1200° F. to yield a semisintered granular product (22) which analyzed 56.7% $Cr_2O_3$, 4.8% Al, 8.0% Fe, 0.99 Mg, 6.50% Ca, 0.25% P. This product is comparable to a high grade chromium concentrate. Recovery of chromium in the product was 77% of the chromium originally present in the sludge.

The pregnant aluminate solution (23), now free of chromium (less than 10 ppm Cr) was saved for recycling to the chromium precipitation step in order to build up the aluminum concentration to a level suitable for an autoseeded crystallization of aluminum trihydrate (24) [note Example No. 5].

Example 2

A sample of a typical chromium sludge containing by weight 60% moisture and analyzing on a dry basis about 9.8% Cr, 5.3% Al, 5.2% Fe, 4.5% Ca and 0.1% P was dissolved in $H_2SO_4$ at pH 1.2 and a temperature of 115° F. containing initially 90 gpl sludge (dry basis). After dissolution, 7.5 gpl PO$_4$ was added to enhance the subsequent removal of iron and the pH then raised to 2.8 by the addition of NaOH.

The iron residue remaining after filtering, represented about 23.2% of the original solids content on the dry basis and contained 88% of the total iron in the sludge. A substantially purified solution was obtained.

From the purified solution, a chromium product was recovered by raising the pH to 12 and then adding additional 50 gpl of NaOH.

The chromium precipitate was washed by decantation and analyzed after drying at 250° F. to provide a product containing 56.7% Cr$_2$O$_3$, 2.3% Al, 3.2% Fe, 3.9% Ca, 0.69% P. Following treatment at 1300° F., the product contained 63% Cr$_2$O$_3$. The recovery in the product was 80% of the total chromium in the sludge.

The aluminate solution, free of chromium (less than 10 ppm) was saved for recycling to the chromium recovery step in order to build up the aluminum concentration to a level suitable for a seed crystal-lization of aluminum trihydrate.

Example 3

A sample of chromium sludge containing high phosphorus and calcium content was treated in accordance with the procedure of the present invention.

The sludge containing 52% H$_2$O analyzed 2.7% Cr, 10.8% Al, 0.5% Fe, 4.2% P, 2.9% Ca was dissolved in H$_2$SO$_4$ at pH 1.5 and 125° F. having initially 100 gpl solids on dry basis. Since composition of the sludge did not suggest a need for phosphate addition, the pH of the dissolution liquor was raised to about 2.8 and the residue containing mostly gypsum was filtered off representing 12% of the original solids.

The chromium product was recovered from the substantially purified solution by raising the pH to 12 and by adding 100 gpl NaOH to above pH 12. The chromium hydroxide after washing and drying (220 F) analyzed 40% Cr$_2$O$_3$, 1.4% Al, 4.8% Fe, 8.9% Ca, 1.5% P. After heat treatment in air at 1300+ F., the Cr$_2$O$_3$ content was increased to 49.4% Cr$_2$O$_3$.

Recovery of chromium into the product was 98.4% of the total chromium in the sludge.

Example 4

A sample of relatively high content chromium sludge analyzing 17.5% Cr, 9.6% Al, 7.6% Fe, 4.1% Ca, 0.32% P was treated directly in the chromium recovery step.

In carrying out the method, 150 gpl sludge (on dry basis) was slurried in a NaOH solution of 150 gpl and then conditioned 4 hrs. at 170° F.

The washed chromium product dried at 220° F. analyzed 38% Cr$_2$O$_3$, 12.5% Fe, 1.4% Al, 0.21% P and provided a chromium yield of 99%. The recovery of aluminum in the caustic solution was 90%.

In this test, no disposable residue was made.

Example 5

In this test, the possibility of coprocessing the chromium sludge along with the facilities to recover aluminum from spent catalysts (Mo, V, Al$_2$O$_3$) generated by the oil refining industry was made. A particular spent catalyst contained by weight 4.1% Mo, 7.0% V, 37% Al$_2$O$_3$, 2.5% (Ni+Co), 7.4% S and minor amounts of residuals.

The iron residue produced after recovery of most of chromium and alumina as described in Example No. 1 was further processed with the above alumina based spent catalyst in the ratio of 1:9.

The mixed feed was leached under pressure with caustic solution at 200 gpl NaOH at 380° F. for 2 hours.

The alumina extraction from the mixture was 85%. The residue of this high temperature leaching contained all chromium but in a fixed form which passed the EPA test as non-hazardous material, yielding less than 0.01 ppm Cr in the test leachate, far below the limit of 5 ppm Cr.

From the aluminate solution, aluminum trihydrate product was recovered containing 64.5% Al$_2$O$_3$ and less than 0.01% Cr.

Example 6

The iron residue produced, as described in Example 1, was slurried in water, and in water containing sodium aluminate and free caustic, and in water containing solid alumina and heated under pressure to 200° F. and 400° F. for 1 hour. In all the tests the residue treated at 400° F., passed the EPA chemical toxicity test yielding less than 1 ppm Cr, generally less than 0.1 ppm Cr in the test leachate.

Example 7

The iron residue produced, as described in Example No. 1, was heated in air at 1000° F. for 1 hour and after this treatment the residue passed the EPA toxicity test yielding less than 5 ppm Cr in the test leachate.

Example 8

A chromium waste solution rather than solid material was treated in this example.

The solution contained 9.4 gpl Cr, 6.2 gpl Al, 3.6 gpl Fe and 0.14 gpl P and had a pH of 2.0.

The pH solution was raised to 3.2 with CaO and the precipitate filtered off. From the purified solution, the chromium product was precipitated by adjusting to pH 13 and maintaining a temperature of 110° F. for 1 hour.

The precipitation and recovery of chromium was complete (less than 10 ppm Cr in the solution) and the chromium hydroxide on dry basis analyzed to provide the following: 46.5% Cr$_2$O$_3$, 4.4% Fe, 4.5% Al, 4.3% Ca, 0.28% P. After a heat treatment in air at 1200° F., the chromium oxide contained 49.7% Cr$_2$O$_3$. Iron rejection into the iron residue was 82.8% and the recovery of aluminum in the aluminate solution was 84.4%.

The EPA chemical activity test employed in the foregoing examples is disclosed in the government publication entitled "EPA Test Methods For Evaluating Solid Waste", Office of Solid Waste and Emergency Response, Washington, D.C. 20460, November 1986, SW-846 (Third Edition), reference being made to Chapter Seven, in particular, the sub-heading entitled 7.4 Extraction Procedure Toxicity.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for treating sludge containing substantial amounts of chromium, aluminum and iron which comprises:

forming a slurry of said sludge in water at a temperature ranging from ambient to about 150° F. with the specific gravity of the slurry ranging from about 1.02 to 1.25, adding a mineral acid to said slurry to provide a pH ranging from about 0.1-3 to dissolve selectively said aluminum and said chromium and leave a solids residue containing gangue material comprising an oxidized iron compound, calcium sulfate, calcium fluoride, and calcium silicate, controlling the pH of said solution at range of about 2 to 3.5 to precipitate the iron present, without substantially adversely affecting the dissolved chromium and aluminum, separating said chromium/aluminum-containing solution from said solids therein to provide a substantially purified solution of chromium/-aluminum, raising the pH of the solution to a range of about 12 to 13.8 to precipitate chromium as chromium hydroxide and provide a pregnant aluminate solution, and then subjecting said chromium hydroxide-containing solution to solid/liquid separation and thereby extract chromium hydroxide therefrom and provide a pregnant aluminate solution which is thereafter treated to recover alumina therefrom.

2. The method of claim 1, wherein following the separation of the chromium hydroxide precipitate from said solution, the precipitate is washed, dried and then calcined to provide a chromium oxide-enriched product thereof containing at least about 30% $Cr_2O_3$.

3. The method of claim 1, wherein the pregnant aluminate solution is treated to decrease its pH sufficient to precipitate aluminum trihydrate.

4. The method of claim 3, wherein the aluminate solution is sparged with $CO_2$ to effect the precipitation of aluminum trihydrate which is separated from the solution and the solution remaining recycled to the chromium precipitation step.

5. The method of claim 1, wherein the solids residue remaining after the substantial removal of chromium and aluminum is calcined at an elevated temperature exceeding about 800° F. to convert the residue into non-soluble form for disposal into the environment.

6. The method of claim 1, wherein the solids residue remaining after substantial removal of chromium and aluminum is dispersed in a water medium with or without alkali and heated at a temperature ranging from about 300° F. to 450° F. at a superatmospheric pressure rangign from about 70 to 300 psig to convert said residue into nonsoluble form for disposal into the environment.

7. A method for treating sludge containing substantial amounts of chromium, aluminum and iron which comprises:

forming a slurry of said sludge in water at a temperature ranging from ambient to about 150° F. with the specific gravity of the slurry ranging from about 1.02 to 1.25, adding a mineral acid to said slurry to provide a pH ranging from about 0.1-3 to dissolve selectively said aluminum and said chromium and leave a solids residue containing gangue material comprising an oxidized iron compound, calcium sulfate, calcium fluoride, and calcium silicate, controlling the pH of said solution at range of about 2 to 3.5 to precipitate the iron present, without substantially adversely affecting the dissolved chromium and aluminum, separating said chromium/aluminum-containing solution from said solids therein to provide a substantially purified solution of chromium/aluminum, raising the pH of the solution to a range of about 12 to 13.8 to precipitate chromium as chromium hydroxide and provide a pregnant aluminate solution, subjecting said chromium hydroxide-containing solution to solid-liquid separation and thereby extract chromium hydroxide therefrom and provide a pregnant aluminate solution, washing and drying said chromium hydroxide precipitate, heating said dried precipitate to a calcination temperature ranging from about 500° to 1200° F. to provide a chromium oxide-enriched product thereof containing at least about 30% $Cr_2O_3$, treating said pregnant solution sufficient to decrease its pH and precipitate aluminum trihydrate, separating said aluminum trihydrate from the treated aluminate solution, and recycling said solution to the chromium hydroxide precipitating step.

8. The method of claim 7, wherein said sludge prior to treatment contains by weight about 2.5 to 20% chromium, about 2 to 15% aluminum, 0 to about 15% iron, 0 to about 12% phosphorus, 0 to about 10% calcium and the balance residuals.

9. A method for treating a waste solution containing substantial amounts of dissolved chromium, aluminum and iron which comprises:

controlling the pH of said solution at range of about 2 to 3.5 to precipitate the iron present, without substantially adversely affecting the dissolved chromium and aluminum, separating said chromium/aluminum-containing solution from said solids therein to provide a substantially purified solution of chromium/aluminum, raising the pH of the solution to a range of about 12 to 13.8 to precipitate chromium as chromium hydroxide and provide a pregnant aluminate solution, subjecting said chromium hydroxide-containing solution to solid/liquid separation and thereby extract chromium hydroxide therefrom and provide a pregnant aluminate solution, washing and drying said chromium hydroxide precipitate, heating said dried precipitate to a calcination temperature ranging from about 500° to 1200° F. to provide a chromium oxide-enriched product thereof containing at least about 30% $Cr_2O_3$ treating said pregnant solution sufficient to decrease its pH and precipitate aluminum trihydrate, separating said aluminum trihydrate from the treated aluminate solution, and recycling said solution to the chromium hydroxide precipitating step.

10. The method of claim 9, wherein said waste solution is derived from a sludge which contains by weight about 2.5 to 20% chromium, about 2 to 15% aluminum, 0 to about 15% iron, 0 to about 12% phosphorus and 0 to about 10% calcium.

* * * * *